June 17, 1952  E. T. OAKES  2,600,569
METHOD FOR MAKING MARSHMALLOW
Filed March 28, 1946  2 SHEETS—SHEET 1

INVENTOR
EARLE T. OAKES
BY
Haguel, Meary & Campbell
his ATTORNEYS

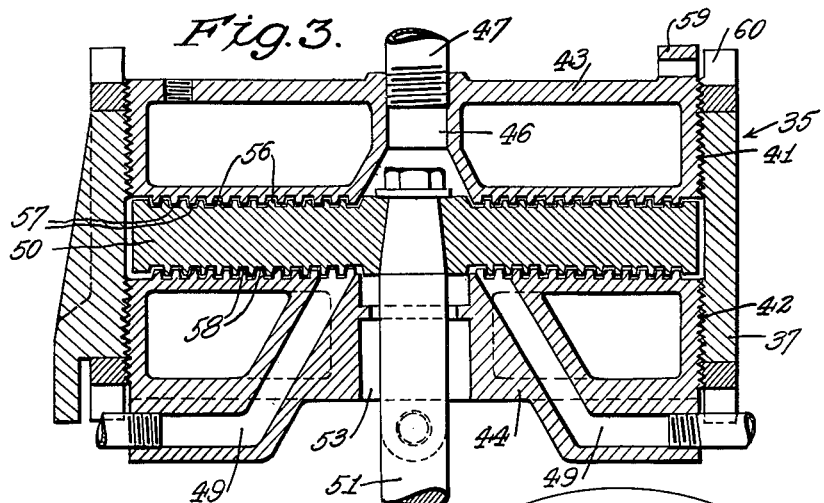
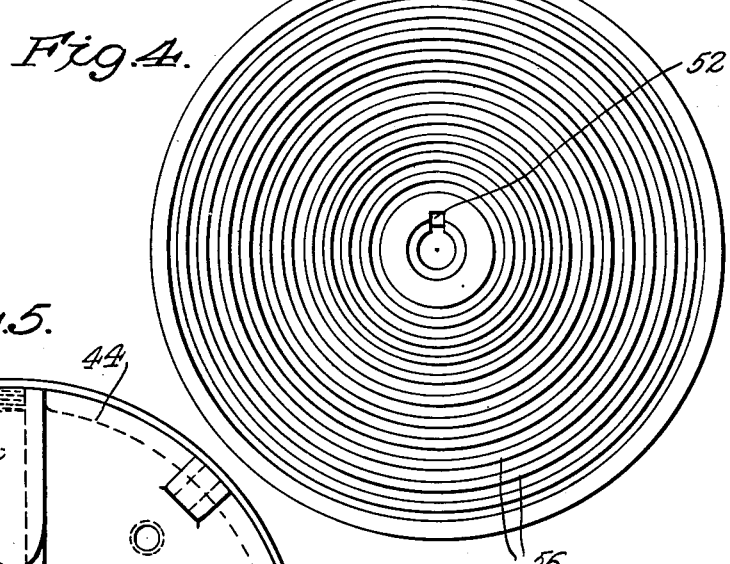
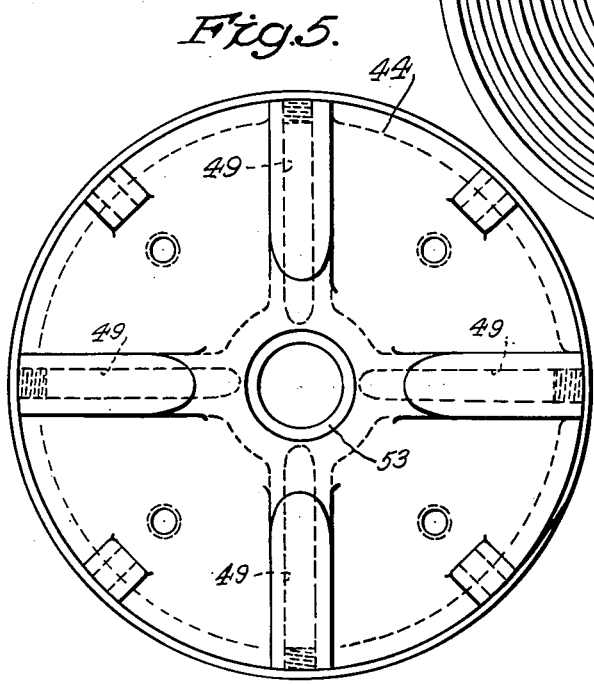

Patented June 17, 1952

2,600,569

UNITED STATES PATENT OFFICE 2,600,569

METHOD FOR MAKING MARSHMALLOW

Earle T. Oakes, Douglaston, N. Y., assignor to E. T. Oakes Corporation, Douglaston, N. Y., a corporation of New York Application March 28, 1946, Serial No. 657,822

2 Claims. (Cl. 107—54)

This invention relates to improvements in methods for manufacturing marshmallow. It relates more particularly to methods for converting marshmallow mixes continuously into marshmallow suitable for filling and coating cakes and cookies or for use as candies alone, or as fillings or coatings for such candies.

Marshmallow is a rather peculiar and difficult substance to prepare in large quantities because of certain of its inherent characteristics. Inasmuch as marshmallow mixes are composed largely of sugar syrups, they tend to be sticky and viscous unless they are diluted with water to reduce their viscosity. In the undiluted state, the mixes cannot be beaten to the fluffy texture required in marshmallow. A marshmallow mix which contains sufficient moisture to render it easily beaten, has the disadvantage that it is relatively soft and when deposited on cakes, cookies, confections or used alone it is not sufficiently stiff to be shape-retaining. This deficiency has to be overcome by drying the marshmallow after it is deposited or made up into candies.

The drying operation is involved and is time consuming. Marshmallow coated cakes and cookies are usually dried in heated dryers having a conveyor for passing the cakes and cookies therethrough. Such driers are expensive to install and operate, particularly in high capacity installations.

Marshmallow candies are usually dried in starch trays or starch boxes. For the sake of economy, the starch is used over and over and it must be sieved and dried frequently to keep it in condition for drying the product. Despite the exercise of great precautions, the starch inevitably becomes contaminated and unsanitary after repeated use. Moreover, large quantities of starch and extensive storage space are required for the candy being dried, for the reason that the candy must be kept in the starch until the candy becomes shape-retaining.

The drying operation, the intensity or extent of the beating operation and variations in the mix cause a very wide variation in the density of the finished marshmallow. Because the effects of all of these factors are unpredictable, it has never been possible consistently to produce finished marshmallow of a predetermined density and texture. Therefore, it is customary in the candy industry to use packages for the candies which are large enough to hold a desired weight of marshmallow of a low density. Variations in density are compensated by varying the amount of marshmallow by weight that is packed in the box. Thus, a full package may have more marshmallow candy in it by weight than the weight indicated on the package or if the packages are filled accurately by weight, the package may only partially be filled. Either package is undesirable from the standpoints of sales and merchandising.

An object of the invention is to provide a method of making marshmallow whereby the marshmallow produced does not require drying and is of sufficient dryness and density to be shape-retaining.

Other objects of the invention will become apparent from the following description of a typical apparatus and method embodying the present invention.

In accordance with the present invention I have provided a method wherein a mixture of the ingredients required for marshmallow are worked, beaten and aerated at superatmospheric gas pressure to incorporate a gas into the mixture and convert the mixture into marshmallow. At the completion of the working operation, the marshmallow is subjected to a reduced pressure, for example, by discharging it into a zone at atmospheric pressure whereby the bubbles of air or gas in the marshmallow can expand and give the desired spongy and fluffy texture to the product.

I have found that by operating at superatmospheric pressure, it is possible to work or beat the marshmallow mix sufficiently to incorporate gas into it while the mix has a viscosity such that it could not be beaten with the prior types of marshmallow beaters. In my new method, I can reduce the water content of the mixture substantially and, in fact, use only the amount of water desired in the finished product. The low moisture content of marshmallow produced in accordance with my method obviates the need for drying of the marshmallow to impart stiffness or shape-retaining properties to it, and the marshmallow may be handled directly in marshmallow depositing or cutting devices for formation into candies directly or as coatings or filling for cakes, cookies, candies and the like. These products may be sugared or coated with starch or other edible material in the usual way and then packed directly in cartons without the necessity of drying the marshmallows.

The method has the further advantage of permitting the density of the product to be regulated during beating to produce marshmallow of a desired density and texture continuously.

For a better understanding of the present invention reference may be had to the accompanying drawings in which:

Figure 3 is a view in section taken on line 3—3 of Figure 2;

Figure 4 is a plan view of the working rotor of the device; and

Figure 5 is a bottom plan view of the bottom plate or end of the applicant's device.

Figure 2:
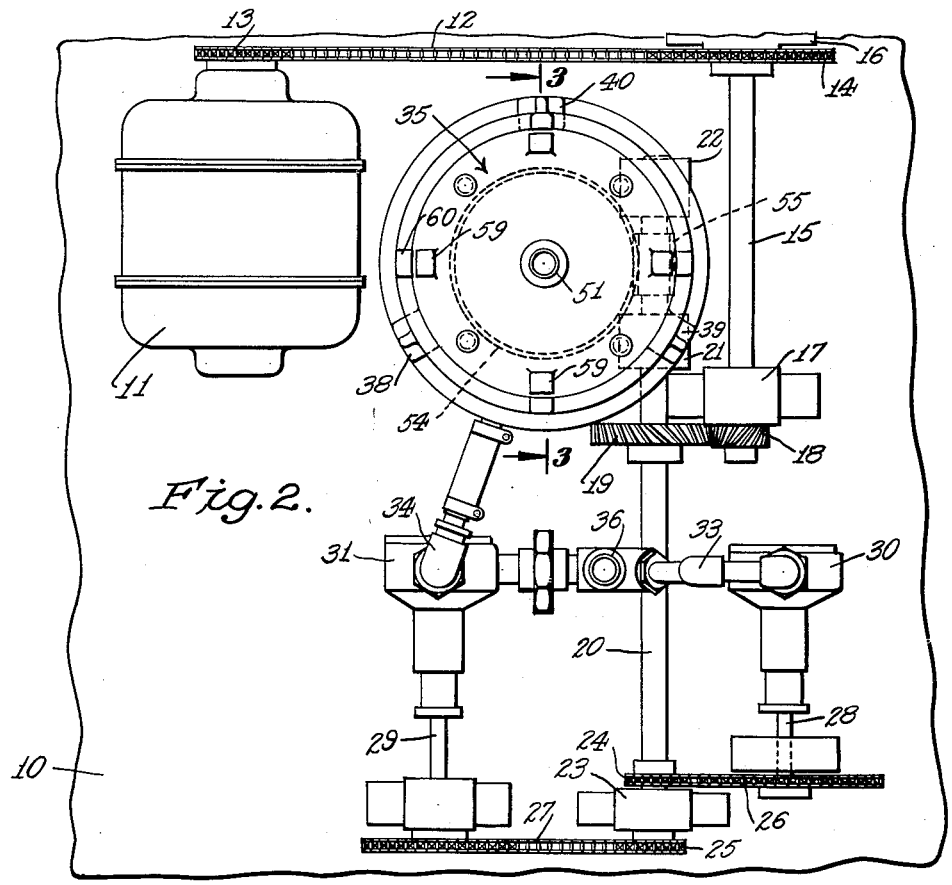
Figure 2 is a plan view of the device disclosed in Figure 1.
Figure 1:
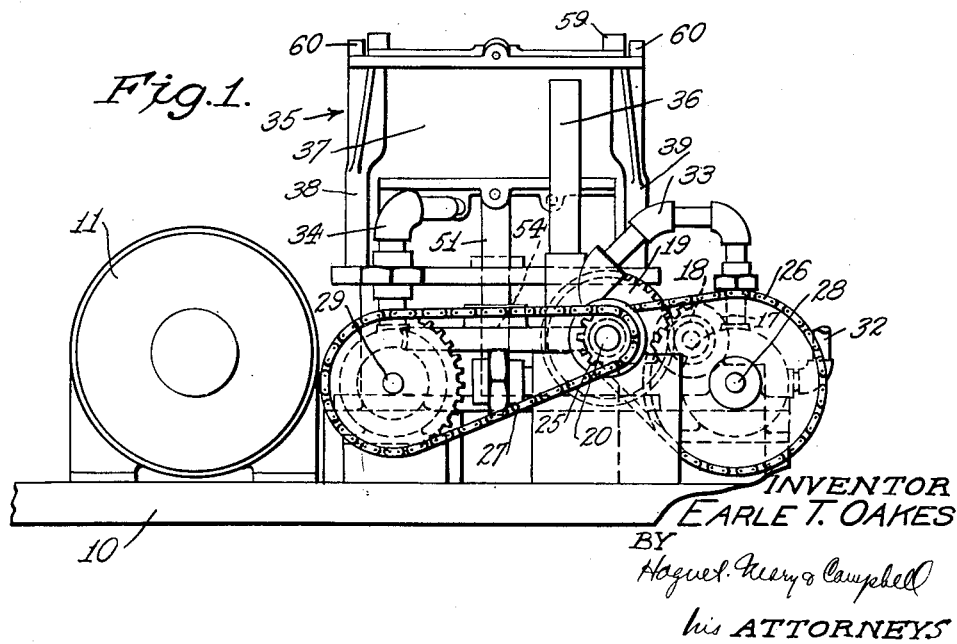
Figure 1 is a view in side elevation of a typical form of marshmallow making device for practicing the present invention.

A typical mixing device for practicing the present invention, as illustrated in Figures 1 and 2, may include a base plate 10 upon which is mounted an electric motor 11. The motor 11 is connected by means of a chain 12 and the sprockets 13 and 14 to a shaft 15 which is rotatably mounted in journals 16 and 17 mounted on the base plate 10. The shaft 15 is provided with a gear 18 which meshes with a second gear 19 carried by the main drive shaft 20 of the device. The shaft 20 is journaled at one end in suitable spaced apart journal blocks 21 and 22 and at its opposite end in a journal 23.

The shaft 20 is further provided with the sprockets 24 and 25 which are connected by means of the chains 26 and 27 to the impeller shafts 28 and 29 of the two pumps 30 and 31, respectively. The pump 30, as shown in Figure 1, has an inlet connection 32 for receiving the marshmallow mix and delivering it through the outlet conduit 33 to the inlet of the pump 31. The pump 31 is also provided with an outlet 34 which is connected to an inlet of the mixing device 35 to be described hereinafter. The conduit 33 is also provided with a coupling and conduit 36 through which air or other gas may be delivered into the mixing device 35. The pump 31 is driven faster than the pump 30 so as to compensate for the air admitted into the mix and to compress the air as it is delivered with the mix into the mixing device 35.

Referring now to Figures 1, 3, 4 and 5, the mixing device may consist of a generally cylindrical shell member 37 which is supported on legs or standards 38, 39 and 40 connected with the base plate 10. If desired the shell may be provided with a water jacket, not shown. The shell 37 is provided with upper and lower internal threaded portions 41 and 42 into which the end plates 43 and 44, respectively, are threaded.

As shown in Figure 3, the end plate 43 may be hollow to form a jacket for receiving hot or cold water to regulate the temperature within the mixing device 35. The end plate 43 is provided with a central opening 46 for receiving a conduit or coupling 47 through which the marshmallow is discharged.

The bottom plate 44 is also hollow for receiving hot or cold water as may be desired. The end plate 44 is further provided with a plurality of passageways 49, each of which extends from the mid-portion of the plate 44 through the plate 44 to the opposite side of the plate adjacent to its periphery.

A disk-like or generally cylindrical rotor member 50 is mounted between the end plates 43 and 44 on a shaft 51 by means of the spline 52 and a nut and washer. The shaft 51 may be mounted in a suitable leakproof bushing or bearing, not shown, within the aperture 53 in the center of the end plate 44 and at its lower end in a suitable thrust bearing, not shown.

The shaft 51, as illustrated in Figure 1 is provided with a worm gear 54 which meshes with and is driven by means of the worm 55 that is mounted on the main drive shaft 20 between the journals 21 and 22.

The rotor 50 is provided with a plurality of concentric annular ribs 56 on its upper and lower surfaces, these ribs being staggered with respect to and interfitting with similar ribs 57 on the upper plate 43 and ribs 58 on the upper surface of the plate 44 as best shown in Figure 3. The arrangement of the ribs 56, 57 and 58 provides tortuous paths radially of the rotor through which the mix must pass. When the rotor 50 is rotated, the marshmallow mix is subjected to an intensive working, pulling and kneading as it flows between the rotor 50 and the end plates 43 and 44. To increase the beating capacity, the adjacent surfaces of the rotor 50 and the end plates 43 and 44 may be knurled or roughened to increase the kneading action.

The intensity of the working can be varied considerably by adjusting the spacing between the end plates 43 and 44 and the working surfaces of the rotor 50. The end plates may be rotated to thread them toward or away from the rotor until a desired spacing is obtained. Once this spacing has been obtained, the end plates 43 and 44 can be locked in position by passing a pin, for example, through one of the lugs 59 on the end plate 43 and through the spaced apart lugs 60 on the edge of the shell 37. The end plate 44 may be adjusted and locked in position in a similar way. The adjustment of the bottom plate 44 will bring one of the passages 49 close to the outlet of the pump 31 so that the pump may be connected to the passage by means of a flexible coupling 61.

In operation, the marshmallow mix is introduced from a tank or hopper, not shown, through the inlet conduit 32 and through the pumps 30 and 31 into one of the passages 49 in the bottom plate 44, the other passages being closed by suitable plugs. The rotor 50 is rotated in unison with the pumps and the marshmallow mixture, therefore, is moved gradually outwardly between the ribs 57 and 58 at the same time being kneaded and worked and pulled due to its adherence to the ribs on the rotor and the end plate 44. The mixture flows upwardly around the periphery of the rotor 50 and inwardly toward the center of the rotor 50 between the ribs 56 and 57 thereby being worked and beaten. Inasmuch as air or other gas under pressure is introduced into the mixer 35 through the conduit 36, the mix is subjected to superatmospheric pressure and air is beaten uniformly into the mixture. If desired, compressed air can be introduced through one or more of the passages 49 and the pump 31 and the air inlet 36 can be omitted.

As the marshmallow flows outwardly through the opening 46 and conduits 47, the pressure on the mixture is reduced and as a result the air bubbles within the mixture expand and render the mixture fluffy and porous.

During the operation, the mixture may be maintained at a desired temperature by introducing hot or cold water into the hollow end plates 43 and 44 and into the jacket on the shell 37, if a jacket is provided.

The device described above can be cleaned readily by removing the end plates 43 and 44 so that access can be had to all of its interior and exterior surfaces. Inasmuch as the surfaces that are in contact with the marshmallow mix are enclosed, there is less danger of contamination of the device than with those devices heretofore used which usually are of open construction to facilitate of introduction of air into the mixture. Moreover, since the air is under pressure in the applicant's device it can be beaten into the mixture more readily than can air at atmospheric pressure even though the marshmallow mix is more viscous than the mixes commonly used. Furthermore, since the marshmallow is under pressure as it comes from the mixer, it can be piped to the depositing equipment and released into the hopper of such depositing equipment. This obviates the necessity for the unsanitary handling of the marshmallow from the ordinary beaters, as is customarily done where the operator's hands and arms are invariably used in scooping the marshmallow into the hoppers.

In practicing the method of my invention, the marshmallow mix may be made up in the usual way of sugar syrups, flavoring and other essential ingredients such as gelatin, soy bean protein or egg white, and water in the proportion desired in the final product. Thus, for example, marshmallow candies normally contain about 18 per cent moisture. The mixes from which they are made usually contain about 25 per cent moisture so that about 7 per cent of the moisture must be removed by drying after the mixing operation is completed.

Usually, the marshmallow or cake fillings and cookies contain about 27 to 30 per cent moisture. The mixture from which these fillings and coatings are made normally contains initially between 28 and 33 per cent moisture so that 1 to 6 per cent moisture must be removed by a drying operation.

In accordance with my method, the marshmallow mix for marshmallow candies may be prepared initially with 18 per cent moisture and when beaten under super-atmospheric pressure results in a marshmallow candy product containing only 18 per cent moisture. Such candy can be packaged directly without drying.

In the preparation of cake fillings and cookie coatings, the marshmallow may be prepared with the desired moisture content and used directly for coating and filling operations without a subsequent drying operation. In either case, the deposited or shaped marshmallow may be dusted with starch, sugar or other edible material in the usual way to protect it and improve its appearance.

From the preceding description, it will be apparent that I have provided methods whereby marshmallow may be produced continuously with predetermined characteristics such that subsequent drying of the products is not required.

I claim:

1. A method of making marshmallow which comprises preparing a marshmallow mixture containing substantially the quantity of water desired in the finished marshmallow, forcing the marshmallow mixture at a pressure substantially above atmospheric pressure along a path, at least a portion of which is tortuous and is between two relatively moving surfaces to work and agitate the mixture, introducing a gas at a pressure substantially above atmospheric into said mixture as it moves along said path, to incorporate said gas into said mixture in the form of finely divided bubbles, and reducing the pressure on the marshmallow mixture at the end of said path to about atmospheric pressure to permit the bubbles to expand and produce a sponge-like marshmallow having the desired moisture content.

2. A method of making marshmallow which comprises forcing a marshmallow mixture under pressure in a layer of substantial thickness along a tortuous path between two relatively moving surfaces to work and agitate the mixture, introducing gas at super-atmospheric pressure into said mix as it is being worked and agitated to incorporate said gas into said mix in the form of finely divided bubbles, and reducing the pressure on the marshmallow mix to about atmospheric pressure at the end of said path to expand said bubbles and produce marshmallow of a fluffy, light texture.

EARLE T. OAKES.

REFERENCES CITED

The following references are of record in the file of this patent:

UNITED STATES PATENTS

| Number | Name | Date |
| --- | --- | --- |
| 581,206 | Hewitt | Apr. 20, 1897 |
| 1,080,445 | Hey | Dec. 2, 1913 |
| 1,471,697 | Kubes | Oct. 23, 1923 |
| 1,670,593 | Miller | May 22, 1928 |
| 2,197,919 | Bowman | Apr. 23, 1940 |
| 2,445,617 | Hofmann | July 20, 1948 |

FOREIGN PATENTS

| Number | Country | Date |
| --- | --- | --- |
| 2,650 | Austria | Nov. 10, 1900 |